Figure 1:
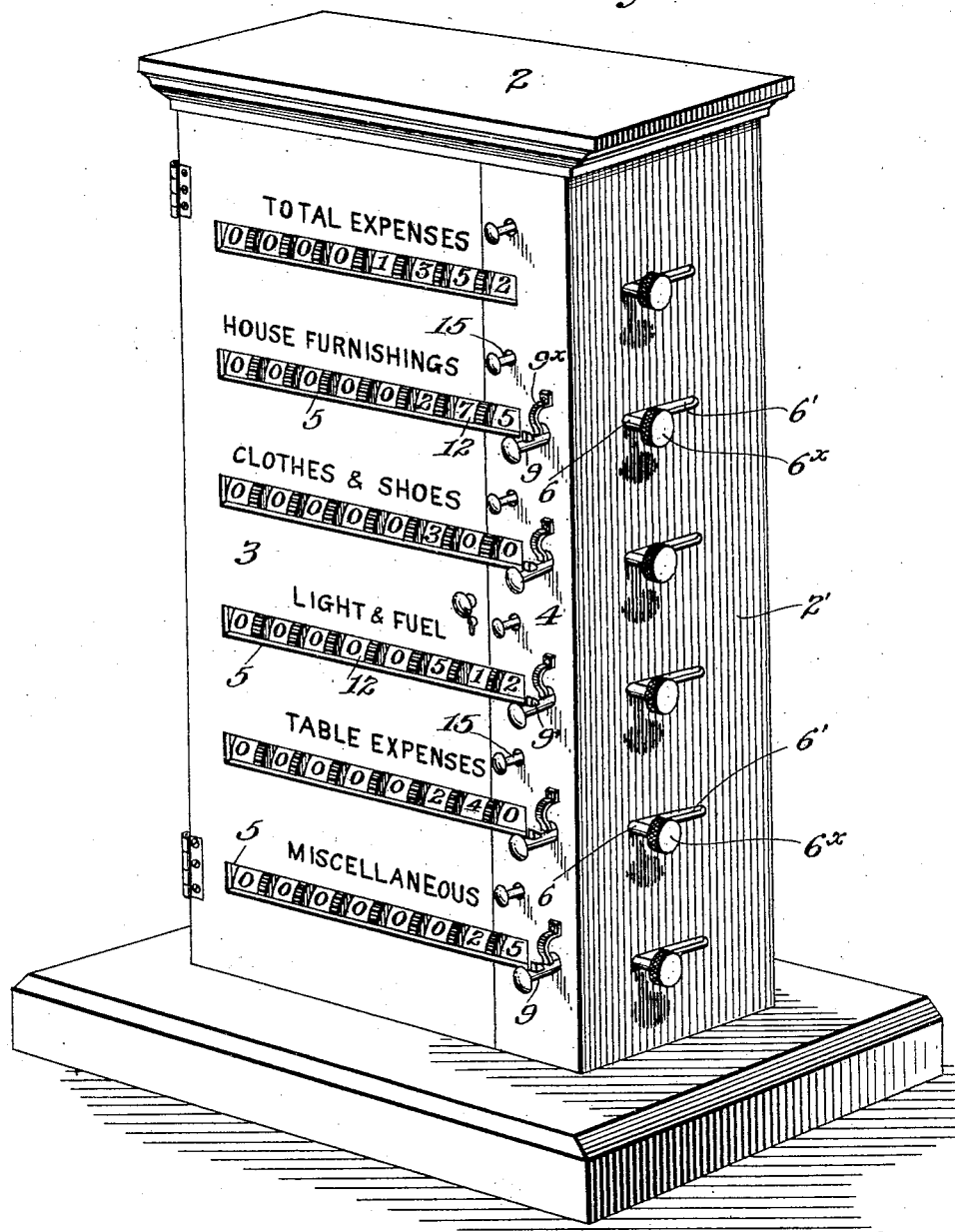

J. G. FERGUSON, Jr.
EXPENSE REGISTERING AND CALCULATING MACHINE.
APPLICATION FILED JULY 1, 1908.

930,595. Patented Aug. 10, 1909.

J. G. FERGUSON, Jr.
EXPENSE REGISTERING AND CALCULATING MACHINE.
APPLICATION FILED JULY 1, 1908.
930,595.
Patented Aug. 10, 1909.
3 SHEETS—SHEET 2.
Fig. 2.
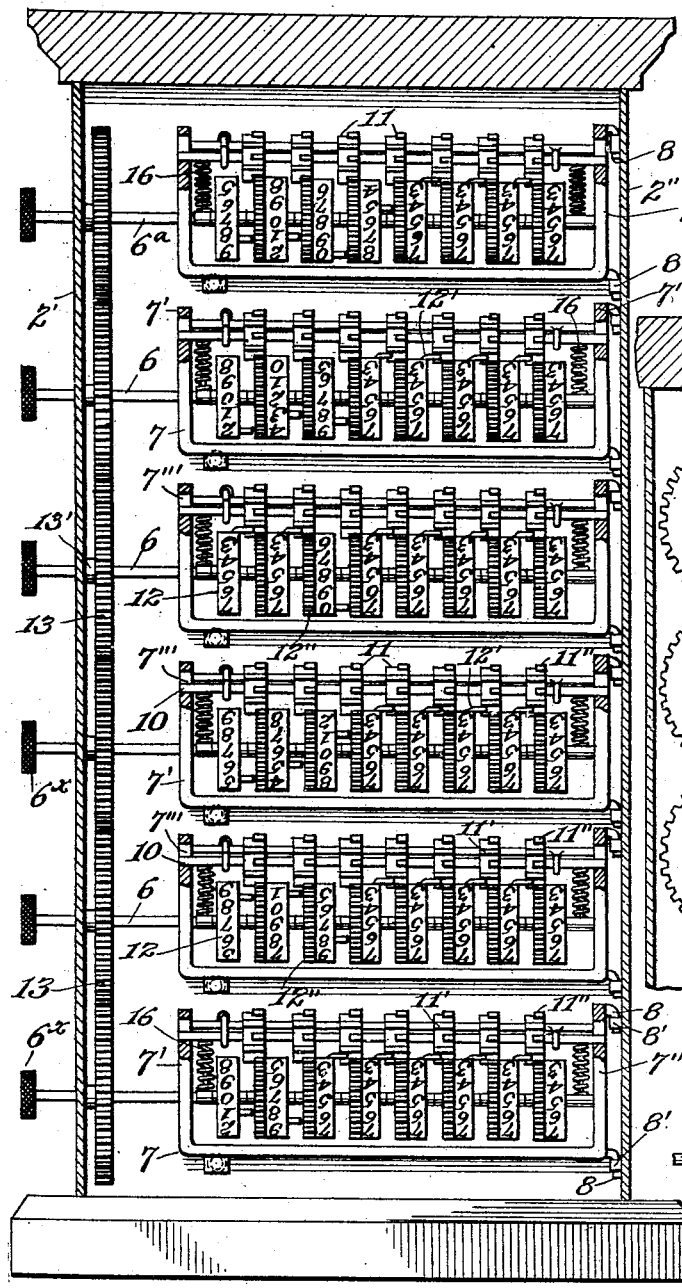
Fig. 3.
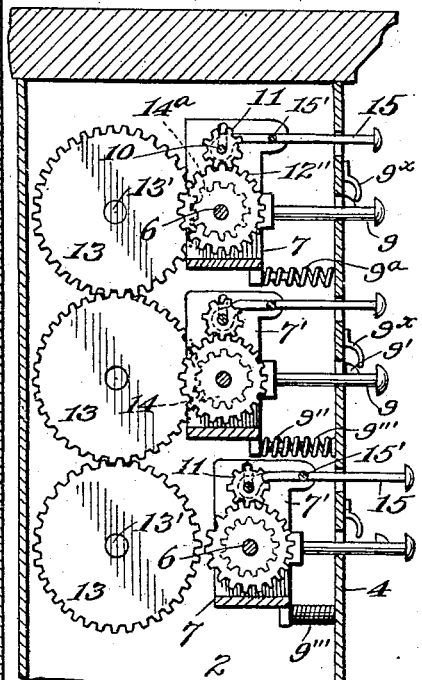
Fig. 5.
Witnesses
M. C. Lyddane
J. D. L. Mulhall
Inventor
John G. Ferguson, Jr.
By Joshua R. H. Potts
Attorney J. G. FERGUSON, Jr.
EXPENSE REGISTERING AND CALCULATING MACHINE.
APPLICATION FILED JULY 1, 1908.
930,595.
Patented Aug. 10, 1909.
3 SHEETS—SHEET 3.
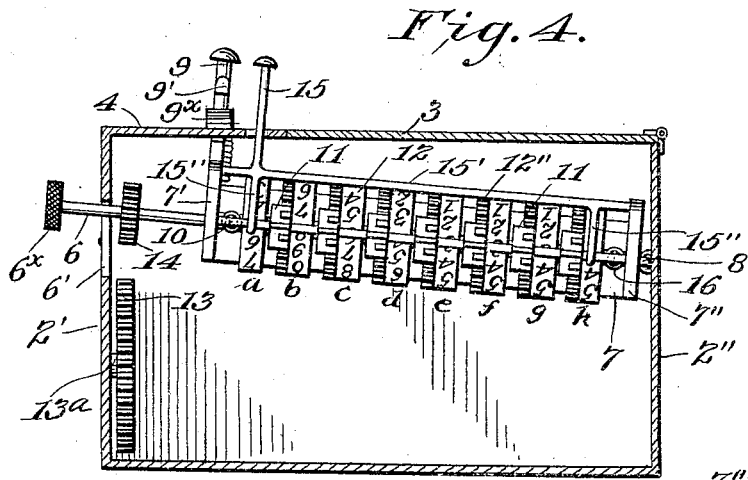
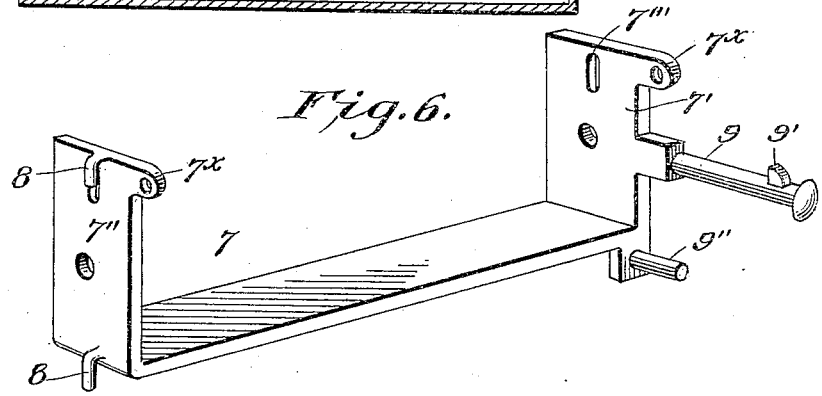
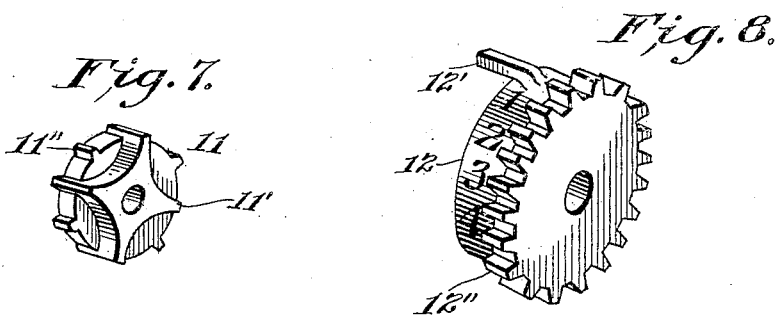
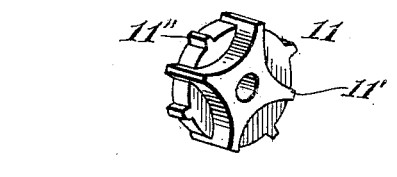
Witnesses
Inventor
John G. Ferguson, Jr.
By
Joshua R. H. Potts
Attorney

UNITED STATES PATENT OFFICE.

JOHN G. FERGUSON, JR., OF PHILADELPHIA, PENNSYLVANIA.

EXPENSE REGISTERING AND CALCULATING MACHINE.

No. 930,595.     Specification of Letters Patent.     Patented Aug. 10, 1909.

Application filed July 1, 1908. Serial No. 441,298.

*To all whom it may concern:*

Be it known that I, JOHN G. FERGUSON, Jr., a citizen of the United States, residing at Philadelphia, in the county of Philadelphia and State of Pennsylvania, have invented certain new and useful Improvements in Expense Registering and Calculating Machines, of which the following is a specification.

My invention relates to calculating mechanism and particularly to a mechanism for registering various household expenses and automatically totaling these expenses, the object of my invention being to provide a mechanism wherein a register may be made of separate expenses connected with all or several of the different branches of household expenses, whereby the actuation of a unit wheel for any one of the separate expense accounting gear trains will also actuate the train of totaling gears, thus providing for a register being made not only of the total of each separate branch of expense, but a total of all the branches.

My invention consists in the arrangement of parts and details of construction set forth in the accompanying specification and more particularly stated in the claims.

In the drawings, Figure 1 is a perspective view of my expense tabulator. Fig. 2, is a rear elevation of the same, the rear of the casing being removed. Fig. 3, is an enlarged detail section of the upper part of the section. Fig. 4, is an enlarged plan view of one set of numeral wheels in place in the casing. Fig. 5, is a detail section of the numeral wheels and shaft. Fig. 6, is a perspective view of the supporting bracket for a set of numeral wheels. Fig. 7, is a detail perspective of one of the transmitting gears, and Fig. 8, is a perspective of a numeral wheel and its attached gear.

Like reference characters throughout the several views designate like parts.

My expense tabulating or calculating mechanism is designed to be contained within a casing 2 of any suitable design or character having the sides 2', 2'' and the door 3. As seen the door does not extend across the entire front of the casing, but only partly across, the remainder of the casing being taken up by a jamb 4. The front of the casing is transversely slotted as at 5 for the display of the numerals of the numeral disks 12. As shown there are six of these slots for the display of numerals indicating the expenses incident to the provision of light and fuel, wearing apparel, food and miscellaneous articles and one covering the total expense of the household for a definite time. I have shown these subdivisions of the household expense simply for illustration, and of course do not limit myself thereto as more or other subdivisions might be used without departing from the spirit of my invention.

By reference to Fig. 2, it will be seen that my mechanism comprises a series of transverse shafts 6, one for each set of numeral wheels, which shafts are rotatably mounted in hinged brackets 7 shown in detail in Fig. 6. The end 2' of the casing 2 is slotted as at 6' for the passage of the free end of the shafts 6. The sets of numeral wheels and their supports are alike and hence a description of one will sufficiently indicate the construction of the others.

Hinged upon the inner face of the end 2'' of the casing 2 is a bracket 7 consisting of a bottom piece and two upstanding ends 7', 7'', the end 7'' carries the pintles 8 for engagement with eyes 8' on the end 2'. The free end 7' of the bracket has a slot 7''' for the passage of a shaft 10 to be hereafter described, and projecting from the front of the bracket is a shifting push rod 9 having on it a detent tooth 9'. Also projecting from the bracket 7 is a pin 9'' on which is supported a coiled spring 9'''. The functions of these parts will be later described. Through the center of the bracket passes the longitudinal shaft 6.

Mounted parallel with the rotatable shaft 6 is a fixed shaft 10, carrying a series of independently rotatable transmission wheels 11, one of which is shown in Fig. 7. Each of the numeral wheels 12 on shaft 6, consists of a disk having on its edge the numerals from 0 to 9, and each has projecting from it at the naught mark the tappet 12' which is adapted to engage with the transmitting wheel 11 once in every revolution of the wheel 12. The first or unit numeral wheel of each set is fixed on its shaft 6, but all the others are loose.

Attached to the wheel 12 so as to revolve with it or made integral with the disk, is the toothed gear wheel 12'' adapted to mesh with the teeth on one side of the transmitting gear 11. There are of course as many numeral wheels as may be desired or found necessary. I have shown eight numeral disks admitting of registering an expense account ranging from one cent into the hundreds of thousands of dollars.

Mounted rotatably upon each of the shafts 10 are a series of transmitting wheels 11, one of which is shown in Fig. 7. All of the wheels 12 are independent of each other and all but the first loose on shaft 6. Motion is to be communicated to each numeral disk only once upon a complete revolution of the numeral disk immediately preceding it, hence I have provided the transmitting wheels 11. Each is adapted to be turned one tooth, or a certain portion of its movement once upon every complete revolution of the numeral disk immediately preceding it, and to transmit such movement to the next following disk. To this end I form each transmitting wheel of two conjoined integral sections, one lateral half of the wheel having four teeth 11', and the other half having eight teeth 11''. The four toothed side of the wheel is engaged by the tappet 12'. Every complete revolution of the disk 12 therefore gives one quarter of a revolution to gear wheel 11. This motion is transmitted through teeth 11'' to toothed gears 12'' fast on the numeral wheel 12 in advance of the numeral wheel which has just completed its revolution.

Referring to Fig. 4, after a numeral wheel $a$ has completed one revolution, its tappet will come to a point where it engages with that wheel 11 located between it and wheel $b$. It will turn this wheel 11 once which will transmit movement to wheel $b$ sufficient to bring the next higher numeral into position before the slot 5 in the casing. When this wheel $b$ has completed an entire revolution, a movement equal to one numeral will be transmitted to the next following wheel $c$ and so on along the entire series $d$, $e$, $f$, $g$ and $h$, after the usual manner of calculating and tabulating mechanism.

The first numeral wheel of the series is fast on shaft 6 and turns with it, and hence by turning shaft 6 through the milled head $6^x$ or a crank on the shaft, the other numeral wheels are actuated to properly carry forward the addition.

As it is desired to provide a register of the total amount expended, it is necessary that any of the shafts 6 should be capable of actuating the totaling shaft $6^a$ and that means be provided so that at any one time all but one of the shafts may be thrown out of engagement with the totaling shaft $6^a$. To the first end I further provide the train of toothed gears 13 mounted on stub shafts 13', gearing with each other and adapted to gear with the shafts 6 through the pinions 14 and transmit the rotation of any one of these shafts to the totaling shaft $6^a$.

To the end that each of the shafts 6 and pinions 14 may be kept normally out of mesh with the gears 13, I support each set of numeral disks of the actuating gears 11', 11'', 12'', and their shafts 6 and 10 on the hinged brackets 7 hereinafter described, which have their free ends normally held outward by a contractile spring 9''' and forced inward by manual pressure on the push pin 9 until the pinions 14 engage the gear 13. Upon the pin 9 being pushed in any rotation of the shaft 6 will be communicated through the train of gears to the shaft $6^a$. In order that the bracket may be held in its inward position without the necessity of holding it so by manual pressure, I have provided the detent tooth 9' which engages with the spring latch $9^x$ fast upon the front of the jamb 4 as shown in Fig. 1. This spring may be of any suitable construction which will be adapted to hold the push pin 9 inward when the detent is forced beyond it.

The slots 6' it will be seen are necessary to allow the movement of the shaft 6 backward and forward as the push pin is forced inward or outward. The spring 9''' is supported upon the pin 9'' and at its outer end bears against the inside of the jamb 4. The spring however might be mounted in any other manner which would accomplish this result.

It will be obvious now that under normal conditions the shafts 6 may be separately and independently rotated without rotating the gears 13, but that upon pushing inward on the push pin 9 the pinion 14 is thrown into engagement with the gear 13 and motion is transmitted to the totaling disks. The totaling shaft $6^a$ through its pinion is kept normally in mesh with the gear 13, but its pinion $14^a$ is adapted to be drawn out of mesh with 13 by means of the pin 9 and held outward by means of the spring $9^a$.

It is necessary that the numeral disks and their gears of each series, should be capable of being reversely actuated in order that the disks may be turned back to their original position. This is preferably done by manually operating each numeral disk, and in order to do this it is necessary to disconnect the numeral disks from the gears 11. I have therefore provided means whereby the shaft 10 carrying the gears 11 may be lifted so that the gears 11 are moved out of engagement with the disk tappets 12' or the gears 12''. To this end I support the shaft 10 in slotted bearings 7''' in the bracket 7, and provide a lever 15 projecting from a rock shaft 15' which is journaled in bearings $7^x$ formed upon the bracket 7. The rock shaft is provided with two inwardly projecting fingers or arms 15'' which engage with the shaft 10. Thus upon a depression of the arm 15, the arms 15'' are raised lifting the shaft 10 up out of engagement with the gear wheels 12''. The arm 15 projects out through a sufficiently large opening in the jamb 4 to permit of the change in position of the arm due to the bracket being swung inward or outward. By disconnecting the gears 11′, 11″ with the tappet 12′ and the gear wheel 12″ each individual numeral disk may be quickly and easily rotated by the finger of the operator until it is brought around to the zero point.

The operation of my construction is obvious from the description given. Any one of the sets of numeral disks may be actuated by means of the milled head 6ˣ. The rotation of the milled head 6ˣ will automatically add unit to unit until the total of expense in that particular line is shown by the numeral wheels, while at the same time this amount has been added to the amount previously shown on the totaling disks.

When it is desired to return the numeral disks to their original position, it is only necessary to open the door 3, depress the arm 15 and with the other hand manually turn the numeral disks until they reach the zero point.

My invention is extremely convenient, its construction is simple and it is positive in operation. While I have shown what I believe to be the preferable form of gears, I do not wish to be limited thereto as these may be modified in many ways without departing from the invention.

Having thus described my invention what I claim as new and desire to secure by Letters Patent is:

1. In an expense registering mechanism, the combination with a set of totaling numeral wheels, a plurality of sets of separate account numeral wheels, independent rotatable means for turning each set of separate account numeral wheels and the set of totaling wheels, a chain of gears, and independent operating means permitting any of said sets of separate account numeral wheels to be moved into or out of operative engagement with the chain of gears, and means for moving the totaling wheels into or out of operative engagement with the chain of gears.

2. In an expense registering mechanism, the combination with a chain of gears, of a set of totaling numeral wheels, means for turning the same, means for moving the wheels into or out of operative engagement with the chain of gears, a plurality of sets of separate account numeral wheels, independent means for rotating separately each set of separate account numeral wheels, independent means for moving any of said sets of separate account wheels into or out of operative engagement with the chain of gears, and means for holding said sets of wheels into or out of operative engagement with the chain of gears.

3. In an expense registering mechanism, the combination with a series of swinging brackets, a series of registers supported in said brackets, a pinion on each of said registers, a chain of gears, and means for swinging any of said brackets, so as to bring its pinion into mesh with the chain of gears, one of said registers constituting a total register, and the others separate account registers.

4. An expense registering mechanism having a casing provided with a series of horizontal slots one above the other, a series of rotatable shafts mounted in said casing rearward of the slots, a series of subsidiary numeral wheels mounted on said shafts and showing through the slots of the casing, each set of numeral wheels indicating a separate item of expense, a totaling shaft having numeral wheels arranged thereon showing a total of all expenses, each of the numeral wheels of one set being so geared with the adjacent numeral wheel in advance of it that it shall be moved one numeral upon a complete revolution of the numeral wheel preceding it, independent mechanisms for rotating the shafts of each of the subsidiary numeral wheels, mechanism for communicating the rotation of any one of these shafts to the shaft of the totaling numeral wheels, and means for normally holding the subsidiary numeral wheel mechanism out of engagement with the said totaling shaft.

5. In an expense registering machine, a casing, a series of horizontal shafts carried in said casing and independently rotatable, a series of numeral disks freely rotatable on the shaft, disks forming the first disks of each of said series fixed on said shaft and rotatable therewith, a tappet projecting from each numeral disk, a toothed wheel attached to each disk to be rotated therewith, a countershaft, a series of independently rotatable transmitting gears loose on said shaft and adapted to be engaged by the tappet of an adjacent disk once in every revolution of the disk and to transmit the motion thus received through said toothed wheel to the next following disk, a train of transmitting gears mounted upon said casing and engaging with each other, a totaling shaft having a series of numeral wheels mounted thereon, each of the numeral wheels being so geared with the adjacent numeral wheel in advance of it that it shall be moved one numeral upon a complete revolution of the wheel preceding it, gearing mounted upon each of said shafts adapted to engage with said transmitting gears, mechanism for holding all of said shafts except the totaling shaft in such position that their gears shall not engage with said transmitting gears, and means for moving said shafts so as to bring said gears into engagement.

6. An expense tabulating mechanism having a casing, a series of sets of numeral wheels showing through said casing, each set indicating a separate item of expense, and a set of numeral wheels showing a total of all expenses, each of the numeral wheels of one set being so geared with the adjacent numeral wheel in advance of it that it shall be moved one numeral upon a complete revolution of the numeral wheel preceding it, hinged brackets in which each set of numeral wheels is supported, a series of toothed gears intermeshing with each other, each gear wheel being set adjacent to the shaft of a set of numeral wheels, one of said toothed gears driving the shaft of the totaling numeral wheels, the shafts of the other numeral wheels having pinions adapted to engage with said toothed gears when the brackets supporting said shafts and numeral wheels are forced inward.

7. An expense tabulating mechanism having a casing, a series of sets of numeral wheels showing through said casing, each set mounted upon a separate shaft, a set of numeral wheels showing a total of all expenses and mounted upon a shaft, each of the numeral wheels of one set being so geared with the adjacent numeral wheel of the same set in advance of it that it shall be moved one numeral upon a complete revolution of the numeral wheel preceding it, brackets hinged to the interior of said casing supporting each of said shafts, pinions mounted upon each of said shafts, and a series of toothed gears mounted vertically upon the side of said casing meshing with each other and adapted to mesh with said pinions when the hinged brackets are forced inward, the uppermost of said toothed gears normally having engagement with the shaft of said totaling set of numeral wheels.

8. An expense tabulating mechanism having a casing provided with a hinged door having a series of slots, a series of shafts within the casing parallel to said slots, a series of numeral wheels mounted on each shaft and so arranged that the numerals thereon will show through said slots, a series of countershafts parallel to said numeral wheel carrying shafts, independently rotatable, transmitting gears arranged on said countershafts and gearing with the two adjacent numeral wheels in such manner that a complete revolution of one of said numeral wheels will move said transmitting gear a fraction of its rotation and that such fractional movement will be communicated to the next following numeral wheel, a bracket in which said shafts are mounted having slotted bearings for the transmitting shaft, a lever for moving said transmitting shaft and its gears out of engagement with the numeral shaft and its gears, means for pivotally moving the said brackets inward at one end, a train of intermeshing driving gears mounted within the casing and adapted to engage with said numeral shafts and to be disengaged therefrom by moving the hinged brackets in or out, and means for holding any one of said numeral wheel shafts into engagement with the adjacent toothed driving gear wheel.

In testimony whereof I have signed my name to this specification in the presence of two subscribing witnesses.

JOHN G. FERGUSON, Jr.

Witnesses:
R. H. KRENKEL,
J. A. L. MULHALL.